No. 886,156. PATENTED APR. 28, 1908.
K. O. RUE.
HAME.
APPLICATION FILED JAN. 9, 1907. RENEWED NOV. 19, 1907.
2 SHEETS—SHEET 1.
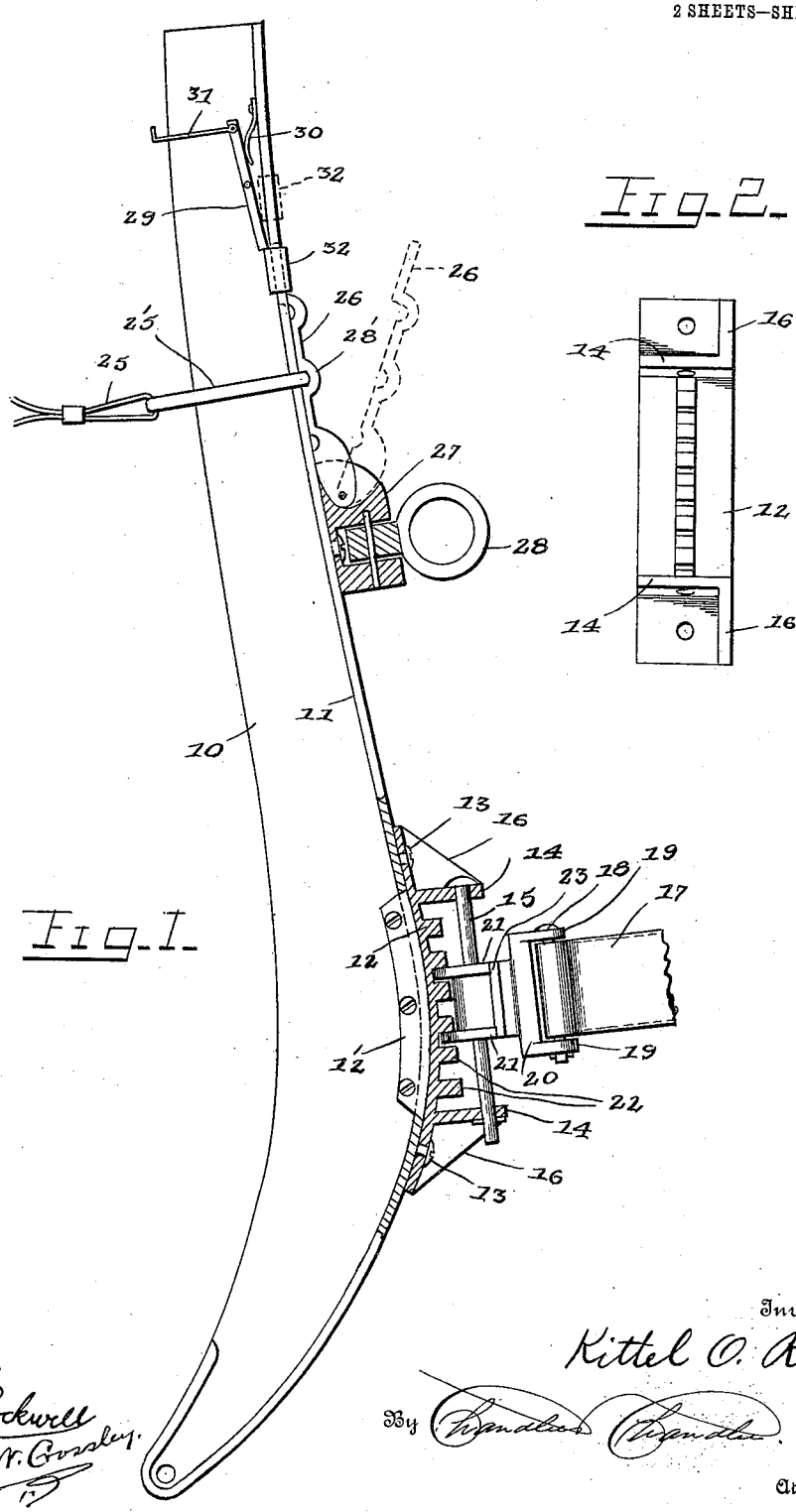

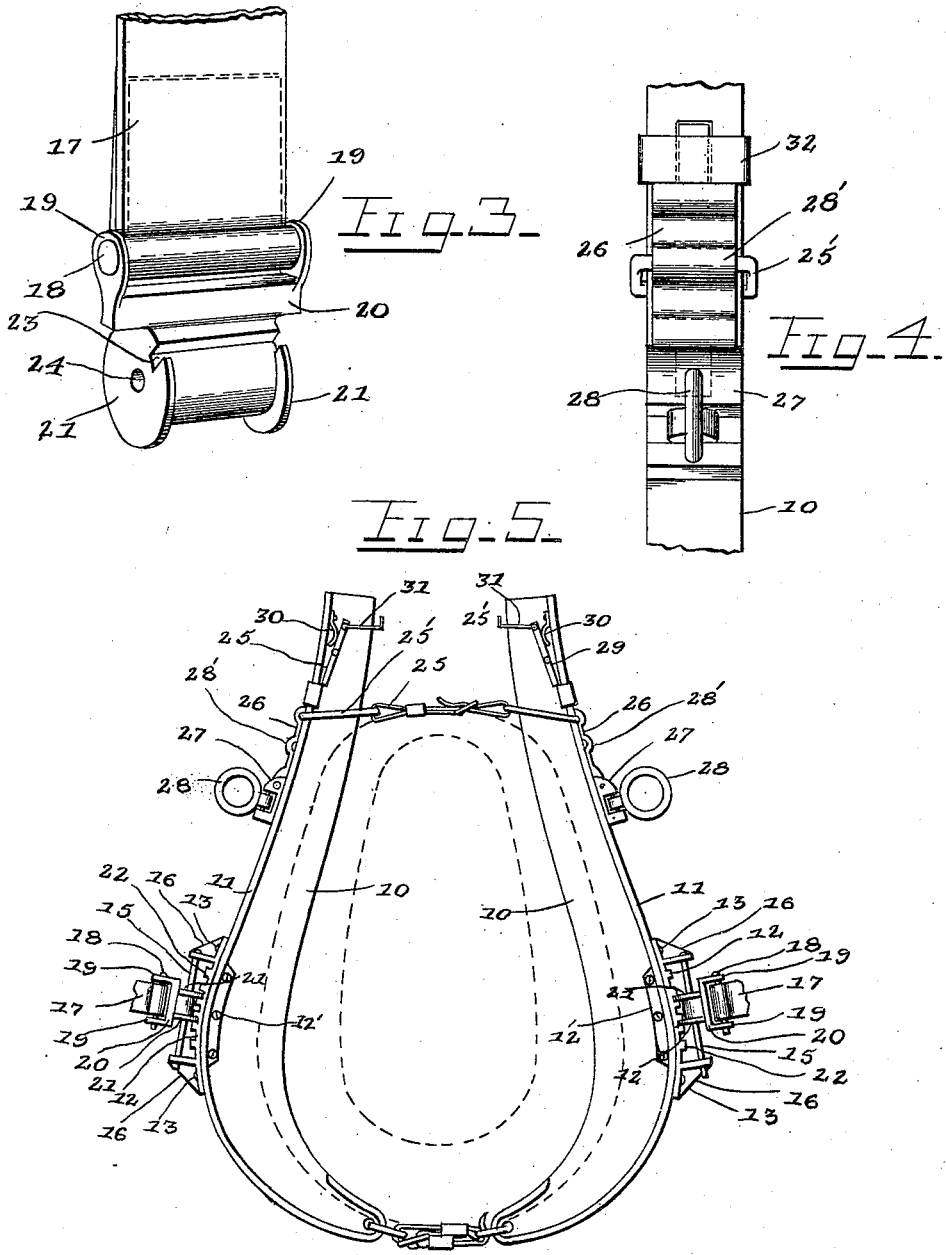

UNITED STATES PATENT OFFICE.

KITTEL O. RUE, OF WOLF-BUTTE, NORTH DAKOTA.

HAME.

No. 886,156. Specification of Letters Patent. Patented April 28, 1908.

Application filed January 9, 1907, Serial No. 351,492. Renewed November 19, 1907. Serial No. 402,912.

*To all whom it may concern:*

Be it known that I, KITTEL O. RUE, a citizen of the United States, residing at Wolf-Butte, in the county of Adams and State of North Dakota, have invented certain new and useful Improvements in Hames; and I do hereby declare the following to be a full, clear, and exact description of the invention, such as will enable others skilled in the art to which it appertains to make and use the same.

This invention has relation to hames, in which the means for connecting the tug or trace therewith is adjustable up and down, as is also the connection between the upper portions of the hames, so as to adjust the harness up or down on the horse without unharnessing the animal.

To the foregoing ends the nature of the invention of the improvements is shown in the annexed drawing, forming a part of this specification, and in view of which drawings the invention will be first described in detail as to its construction and mode of operation, and then be pointed out in the subjoined claims.

Of the said drawings, Figure 1 is a sectional view of a hame provided with my improvements. Fig. 2 is a face view of a part of the means for adjusting the tug-attaching means. Fig. 3 is a perspective view of the tug-attaching means detached. Fig. 4 is a face view of the means for adjusting the hames connecting means so as to make them high or low. Fig. 5 is a front view of a pair of hames.

Similar figures of reference designate similar parts or features, as the case may be, wherever they occur.

In the drawings, 10 designates a hame that may be composed of steel or other suitable material made to fit upon a horse collar and having a lateral flange 11 on its rear edge. 12 designates a base plate secured by means of screws 13, or by other suitable means, at a proper point to the outside or rear side of the flange 11. The plate 12 is provided with perforated ears 14 that extend rearwardly from the face of the said plate near the ends thereof, and through the perforations in said ears there extends a pintle or bolt 15 keyed in place so that it cannot be accidentally dislodged. Extending from the top of each ear at its inner edge in an inclined direction down to the end of the plate 12 are flanges 16 that serve as guards to the ends of the pintle 15.

17 designates the tug or trace that is connected with a bolt 18 passed through the ears 19 on the ends of a yoke 20 that has plates or flanges 21 compounded with it, the forward ends of which flanges 21 extend forward between teeth 22 projecting from the plate 12. The said flanges 21, forward of the yoke 20, are made round and extend between the teeth 22 that, as stated, project rearwardly from the plate 12 between its flanges 14. There is a rounded connection or barrel between the flanges 21, which barrel has an opening 24 through it and its flanges, through which opening the bolt or pintle 15 extends so as to give the yoke 20 the character of a leaf or member of a hinge of which the bolt 15 is the pivot or pintle. The flanges 21, as well as the connection between them is slotted, as at 23, the said slot being wide and deep enough to have the outer ends of the teeth 22 pass therethrough when the yoke is folded forward over the teeth, in which case the yoke may be adjusted up or down on the pintle 15 and thus bring the draft of the tug 17 on the proper line on the hames in accordance with the size to which the latter has been adjusted. When the yoke is folded back to normal position, the teeth on the plate 12 will keep it in place.

The plate 12 may have a connecting part 12′ that extends through the flange 11 of the hame to its forward side, where it is fastened in any suitable way to hold the said plate securely on the hame.

In order to adjust the hames to suit the size of the collar and so make them "high top" or "low top", the connecting straps or means 25 that is connected with a band, forming a part of it, which band encircles the hames, is adjusted up or down thereon, as the case may be. In order to hold the loop or band 25, which may be of metal, in adjusted position on the hame, a clasping plate 26 is hinged or pivoted at its lower end on the base 27 to which the ring 28 through which the lines pass is pivoted. The said pivoted keeper plate 26 has in effect outward bent loops 28 formed in it within which the band may be engaged. Under this construction the band 26 may be adjusted up or down on the hame so as to come within any of the loops 28 and so regulate the hames to suit the size of the collar on the horse.

When the loop or band is to be adjusted, the upper end of the plate 26 will be moved outward from the hame on its hinge, as indicated in Fig. 1, to permit the said adjustment to be accomplished. When the keeper plate is folded down on the hames a slide 32 on the flange 11 is adapted to be moved down and engage its upper end and hold it in position on the hames. A locking bar 29 pivoted on the hames and pressed outward at its upper end by a spring 30 engages the upper edge of the said slide by its lower end and thus locks the slide from being unintentionally moved upward to disengage the upper end of the keeper plate. A pin 31 connected with the upper end of the pivoted bar 29 extends outward or forward therefrom so that when it is desired to release the keeper plate to adjust the band by pressing on the outer end of said pin 31, the locking bar 29 will be pressed inward against the stress of the spring 30, releasing the slide 32 and allowing the upper end of the keeper plate to be moved outward as stated.

When the size of the collar is changed to suit a horse of different size from that formerly used, or when, for other reasons, the size of the collar is changed from that on which the hames were formerly used, it becomes necessary to adjust the line of draft of the tug straps or traces to suitable points, as also to vary the connections between the hames at the top so that they will be suited to the size of collar. By my improvements, which are at once simple in construction, entirely efficient and convenient of manipulation, the changes mentioned can be accomplished without taking the harness off the horse.

It is to be noted that various changes may be made in the form and arrangements of parts and features of the device in which the invention is shown to be embodied, without departing from the general nature or spirit thereof.

What is claimed as the invention, is:—

1. The combination with the hame, of a toothed plate secured thereon having flanges on its end portions and a pintle bolt extended through the said flanges, a yoke having the tug attached thereto, said yoke being provided with means having flanges extending between the teeth of the said plate, and a slot formed in the said flanges and connecting means, whereby the yoke may be folded over on said plate with the teeth thereof extending into the said slot and said yoke be allowed to be adjusted on the said plate, substantially as described.

2. The combination with the hames having a toothed and flanged plate connected therewith, a pintle extended through the said flanges, a yoke with which the tug is connected having flanges extended between the said teeth and hinged on said pintle, said flanges being slotted to permit the teeth to pass therethrough when the yoke is folded over on the said plate.

In testimony whereof, I affix my signature in presence of two witnesses.

KITTEL O. RUE.

Witnesses:
 ANDRW. H. OLSON,
 HELMES DAMMEN.